Oct. 26, 1965  R. W. VAN TUYLE ETAL  3,214,364
OZONE GENERATOR
Filed July 7, 1961  2 Sheets-Sheet 1

ROBERT W. VAN TUYLE
RICHARD P. ROLFES
INVENTORS

BY *D. J. De Witt*
ATTORNEY

United States Patent Office 3,214,364
Patented Oct. 26, 1965

3,214,364
OZONE GENERATOR
Robert W. Van Tuyle, Cincinnati, and Richard P. Rolfes, Greenhills, Ohio, assignors to Emery Industries, Inc., Cincinnati, Ohio, a corporation of Ohio
Filed July 7, 1961, Ser. No. 122,470
4 Claims. (Cl. 204—321)

This invention is directed to the design of a silent electric discharge type of ozone generator and particularly to the type in which the electrodes and dielectrics are in the form of tubes.

Ozone is produced by a high voltage discharge between two closely spaced electrodes, between which has been placed a dielectric. Without the dielectric the discharge is in the form of a spark or arc which may incidentally produce ozone, but only in traces. The silent discharge which takes place through the dielectric, although more efficient than a spark or corona discharge, is still quite inefficient in that approximately 90% of the energy expended is converted into heat. The efficiency of an ozone generator decreases rapidly with an increase in temperature, possibly because of the decomposition of the ozone already produced, but regardless of the cause cooling is necessary and adequate cooling is not practical without adequate electrode surfaces.

As a result, ozone generators are quite bulky in terms of their capacity for producing ozone in pounds per hour. Due to the inherent electrical inefficiency, they are also heavy power consumers requiring from 3 to as high as 10 kwh. per pound of ozone produced.

As the efficiency of ozone production also decreases as the concentration of ozone in the gas being ozonized increases, the concentration is normally kept below 3%. This requires the passing of very large amounts of feed gas through the unit, for which purpose relatively bulky equipment must be used.

In generating ozone in small quantities, such as for air purification or odor elimination, the power efficiency and the size of the equipment required is of little economic consequence as the units, in any case, are quite small. However, this is not the case when ozone is produced in quantity for industrial use, for here the size of the units required become much larger, as does the number of units, and it becomes essential to increase the overall efficiency of the apparatus to the highest practical level if the operation is to be economically attractive.

It is a purpose of this invention to provide a silent electric discharge type of ozone generator having a greater ozone producing capacity per unit of electrode surface than those heretofore employed.

It is a further purpose of this invention to provide an arrangement of electrodes and dielectrics which will result in an improved output of ozone with little or no increase in power consumption per unit of ozone produced.

This invention is directed, in general, to the tubular type of ozone generator as now in common use. These presently available ozone generators consist of an outer metal tube which constitutes one electrode and generally is grounded. This metal tube encloses a glass tube which is the dielectric, the outside diameter of the glass tube being somewhat smaller than the inside diameter of the metal tube and thus providing an annular space through which the gases being ozonized pass. The inside of the glass tube is normally metallized to form the inner electrode. The outer and inner electrodes are connected to the terminals of a high voltage transformer which provides a potential of from 12,000 to 20,000 volts.

The gases to be ozonized are introduced at one end of the unit through an enlarged inlet section formed adjacent to one end of the outer tube, passage of the gases through the inner tube being prevented by fusing one end of said tube to close the same to passage of gas. The gases passing through the annular space between the tubes are ozonized by the silent electric discharge which occurs between the outer electrode and the dielectric. The resulting, ozonized gas mixture then passes out of the unit through an enlarged outlet section formed adjacent to the opposite end of the outer tube, the enlargement of the inlet and outlet sections serving to prevent electrical discharge at these points.

The outer metal tube is encased in a jacket through which water is circulated to remove heat as approximately 90% of the electrical power input is dissipated as heat. To avoid loss in heat transfer due to corrosion or scale, the tubes are generally fabricated of stainless steel and the cooling water is treated to prevent scale formation.

The tubular unit now in commercial usage, and with respect to which the structure of the present invention represents a striking improvement, comprises an outer electrode made up of a metal tube having an internal diameter of about 80 mm. and an inner glass tube having a wall thickness of about 2.5 mm. and an outside diameter of about 74 mm., thus leaving a space of about 3 mm. between the two tubes. This glass tube, which is fused at one end to close the same, is provided on its inner surface with a tightly adhering aluminum coating which serves as the inner electrode. It is found that this unit (when properly water-jacketed, for cooling) is capable of producing approximately 4.6 grams of ozone per hour, per sq. ft. of outer electrode surface, when using an oxygen gas feed stream, an applied voltage of 14,850 v. and a power loading of 45.8 watts per sq. ft. of said outer electrode surface. This represents an energy consumption of 4.51 kwh. per pound of ozone. While in theory it should be possible to increase the gross output by raising the power loading factor, no such result can be obtained since any material increase in the recited power loading, as induced by materially raising the voltage, causes the glass tube to puncture, thus short circuiting the entire unit. Moreover, the problem becomes much worse as an attempt is made to use a glass tube having a wall thickness of less than about 2.5 mm., for such tubes, when incorporated in the prior art device referred to above, puncture much more readily than do those of heavier structure.

The present invention is predicated on the discovery that by using a tubular type of ozonator having the structure described below, higher power loading factors than have heretofore been possible can readily be employed without damaging the glass dielectrics, thus increasing the ozone production rate of a given unit and permitting a drastic reduction in the size of the unit required to produce a given amount of ozone. Moreover, the structure hereof permits of a more efficient usage of current and thus reduces the energy consumption per unit of ozone produced.

In brief, we have found that the objects of the invention can be attained, with resulting advantages of increased efficiency, lower equipment costs and increased ozone production, by using a tubular type of ozonator wherein the inner electrode positioned within the glass tube is comprised of a perforate member such as a grid or screen rather than the metalized wall coating heretofore employed, said perforate member being spaced from the inner surface of the tube. The glass tube employed is one having a wall thickness of not over about 2.25 mm. and as thin as manufacturing techniques will permit, a practical lower limit being about 1.5 mm. Moreover, the glass tube, instead of being closed at one or both ends, is left open at the gas entrant end, while the opposite end is provided with a restricting device arranged to permit only a pre-determined portion of the entrant feed gases (of the order of 30–70% thereof) to pass through the tube in contact with the perforate member comprising the inner electrode. The balance of said gases passes through the annular space between the (outer) metal tube and the (inner) glass tube. The diameters of said tubes are so selected that the width of the annular space therebetween is held below about 2.5 mm. and preferably below about 2 mm., a practical lower limit being about 1 mm.

Quite surprisingly, we have found that by using apparatus of the aforesaid type, it is possible to increase the ozone output of a given unit by 100% or more without increasing the energy consumption per unit of ozone produced as compared with the apparatus of the prior art. Naturally, this permits the size of the equipment to be greatly reduced. Moreover, this increase is obtained without in any way giving rise to increased maintenance problems as by puncture of the dielectric tubes or the like, and even when said tubes do become broken for one reason or another, they can be replaced at far less cost than as the case with the metalized dielectric tubes heretofore employed.

As the ozone output of a single tube is not large, it is the practice to insert a number of tubes in a single cooling jacket. However, in the interests of simplicity and of a clearer expression of the invention, the structure hereof will hereinafter be described in terms of a single-tube unit.

The nature of the present invention will be more fully apparent by reference to the figures of the appended drawing which illustrate the apparatus of the invention in one embodiment thereof, and wherein.

Figure 1:
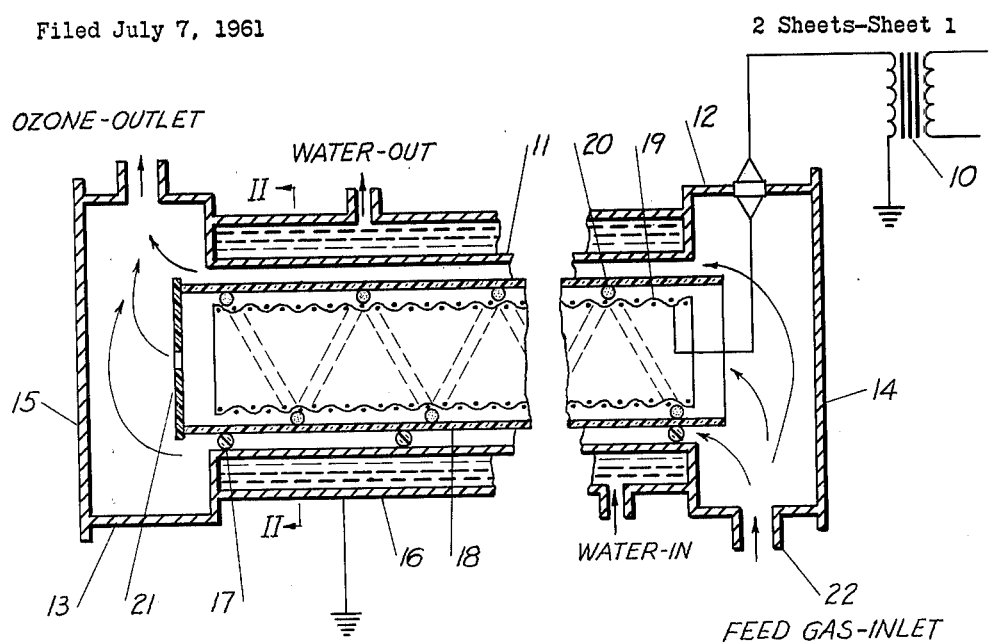
FIG. 1 represents a view taken in longitudinal section through the ozonator unit.
Figure 2:
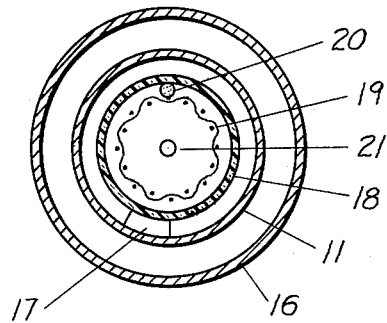
FIG. 2 is a view in cross section through the unit and taken along the line 2—2 of FIG. 1.

Referring more particularly to FIG. 1 of the drawing, there is shown a water-jacketed ozone producing apparatus of the single tube type, the apparatus being connected to a suitable source 10 of high potential alternating current. Shown at 11 is an outer, tubular electrode connected to the power source and fabricated of stainless steel. This electrode has an I.D. of about 80 mm., and is provided with enlarged end sections 12 and 13 having removable cover plates 14 and 15, respectively. Tube 11 is also provided with a surrounding water jacket 16 through which cooling water is passed, as indicated in the drawing. The oxygen-feed enters the unit through the end section 12, and the resulting, ozone-containing gases leave the unit through end section 13.

Mounted concentrically within the tube 11, and spaced therefrom by means of short insulating strips 17, is a glass tube 18 the ends of which extend into the enlarged end sections 12 and 13. Tube 18 forms the dielectric of the unit and has a wall thickness of from about 1.5 to 2.25 mm. and an O.D. of about 76 mm. This provides an annular space approximately 2 mm. wide between the outer electrode and the dielectric, through which space a portion of the feed gases is passed to effect ozonation thereof. It is not essential that the dielectric be exactly centered with respect to the outer electrode. Thus, while the dielectric should not be allowed to lie on the bottom of the electrode, it is not critical if the ends of a slightly bowed dielectric happen to touch the bottom of the outer tube while the center touches the top, or if a slightly oval-shaped dielectric touches at one or more points along its wider diameter but has slightly more than the desired spacing from the outer tube adjacent its narrower diameter surfaces.

An inner, tubular electrode 19, somewhat shorter than the tube 18 and fabricated of wire mesh, is positioned within said member 18. It is connected to the power source, as indicated in the drawing, and is spaced about 0.75 to 1.25 mm. away from the inside wall of the surrounding dielectric by means of an insulating strip 20 helically wound about the electrode surface. The assembly thus provides an outer gap between tubes 11 and 18, where ozone is formed, and a second such gap between the inner electrode and the adjacent dielectric wall, the dimensions of both gaps being rather closely controlled within the limits defined hereinabove.

The end of the tubular member 18 which extends within end section 12 is left open for reception of feed gas, while the opposite end thereof is provided with a plastic covering plate 21 (or any other flow restricting device) provided with a small central orifice having a diameter of from about 1/8 to 3/8 of an inch. This plate acts to restrict passage of the feed gases through tube 18, the opening therein being so sized, with respect to the annular space of the unit between tubes 11 and 18, that from about 30 to 70% of the total feed gases supplied to the unit flow through the tube 18, while the balance of the gases pass between tubes 11 and 18.

We have found that when the gas flow is so divided, the efficiency of the unit is greatly improved, and it becomes possible either (1) to produce ozone with a lower electrical consumption per unit of product than is when all the feed gases are passed between tubes 11 and 18 (as in a conventional unit), or (2) by increasing the power loading factor to produce practically twice as much ozone per unit of outer electrode surface as has heretofore been possible, and this with very little increase in power consumption per unit of product.

Figure 3:
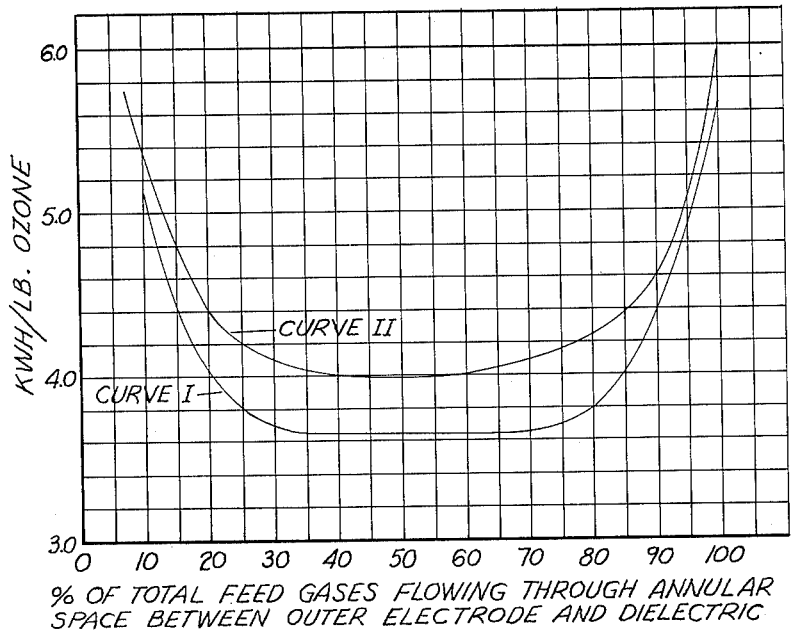
FIG. 3 is a graph showing the power consumption of the unit, at varying power loading factors, as a function of the percent of total feed gases passed between the outer electrode and the dielectric.

The effect of proportioning the gas flow through the center of the dielectric and the annular space between the tubes, using an ozonator unit assembled as shown in the drawing, is presented in curve I of FIG. 3. Thus, with a power loading of 52.3 watts per sq. ft. of outer electrode (11,200 v.) and a production rate of about 6.6 grams of ozone, per hour, per sq. ft. of said electrode, the power requirement is less than 3.6 kwh. per pound of ozone when the flow of feed gases is so regulated that from 30 to 70% of the gas passes through the annular space between tubes 11 and 18 which the balance passes through tube 18. However, outside of this 30 to 70% range, the power consumption rapidly increases and reaches approximately 5.75 kwh. (other conditions remaining the same) when nearly all of the feed gas is passed through said annular space and 7.0 kwh. when the feed is instead passed only through the center of tube 18.

Curve II of FIG. 3 shows the manner in which greatly increased amounts of ozone can be obtained from a given unit simply by increasing the power factor, a result made possible by the fact that tube rupture in the present structure does not occur until extremely high voltages of the order of about 45,000–50,000 are reached. More specifically, curve II shows the power requirement when the apparatus of the drawing is loaded to the extent of 98.3 watts per sq. ft. of outer electrode surface (15,000 v.). Here the production of ozone rises to 11.9 grams per hour, per sq. ft. of outer electrode surface, atlhough the power consumption increases only to 4.0 kwh. per pound of ozone produced, it being noted that this value is again obtained only by properly regulating the gas flow through the respective paths in the unit, as discussed above.

The above production figures of 6.6 and 11.9 grams of ozone per hour compare with a maximum value of about 4.6 grams per sq. ft. as may be obtained with a conventional ozone unit wherein there is employed a thicker dielectric, a wider annular spacing between the tubes, and a gas flow confined to the annular space.

Reference has been made above to the fact that the ozonator of the present invention may be supplied with a feed gas made up of oxygen. However, the advantages of the present equipment can also be realized when using other feed streams such, for example, as those containing nitrogen or carbon dioxide in admixture with the oxygen. Particularly good results can be obtained with feeds containing about 30 to 70% oxygen and the balance carbon dioxide.

The manner in which the present apparatus can be utilized in the production of ozone has been generally set forth above, particularly as regards applicable voltages, power factors and methods of supplying the feed gases and the coolant fluid to the unit. We have found that good results can be obtained by passing from about 3 to 10 pounds per hour of the feed gas mixture through each tubular unit of the device under a pressure of about 5 to 15 p.s.i.g. The cooling of the unit should be such as to maintain the temperature of the ozone-containing product gases at a level below 130° F. and preferably in a range of from about 90 to 125° F.

Having described our invention, we claim:

1. In an azone generating apparatus of the tubular, silent discharge type, said apparatus comprising, in combination, a water-jacketed open-ended metal tube serving as the outer electrode and arranged for connection to an alternating current power source; a gas inlet chamber arranged to receive feed gases and mounted adjacent one end of said tube, and a gas outlet chamber similarly mounted adjacent the other end thereof and arranged to receive ozone-containing product gases and to discharge the same from the unit, said tube opening at its respective ends into said chambers; the improvement comprising an open-ended tube, serving as the dielectric, concentrically mounted within the outer electrode and spaced therefrom to provide an annular passageway permitting said gases to pass from the inlet to the outlet chamber, an open-ended metal member of tubular shape concentrically mounted within said dielectric tube and spaced therefrom, said metal member serving as the inner electrode and being arranged for connection to said power source; said dielectric tube having an orificed plate closing one end thereof and also closing the annular area between said dielectric tube and said inner electrode and the orifice opening in said plate being sized with respect to said annular passageway to provide gas flow control means for so regulating the flow of said gases passing from the inlet to the outlet chamber that from 30 to 70% of said gases travels through the annular passageway between the dielectric tube and the outer electrode, while the balance thereof travels through the open portion of said dielectric tube and through the orifice in said plate.

2. The apparatus of claim 1 wherein the orificed plate is attached at the end of the dielectric tube adjacent tube outlet chamber.

3. The apparatus of claim 2 wherein the dielectric tube has a maximum wall thickness of about 2.25 mm. and an outside diameter such as to leave a space not exceeding about 2.5 mm. between the outer surface of said tube and the inner wall of the outer electrode.

4. The apparatus of claim 2 wherein the space between the inner electrode and the surrounding dielectric is from about 0.75 to 1.25 mm.

References Cited by the Examiner
UNITED STATES PATENTS

| | | | |
|---|---|---|---|
| 1,050,260 | 1/13 | Walden | 204—322 |
| 1,834,705 | 12/31 | Hartman | 204—321 |
| 2,658,868 | 11/53 | Collison | 204—320 |
| 2,850,446 | 9/58 | Cromwell | 204—321 |
| 2,952,606 | 9/60 | Pascale et al. | 204—320 |

OTHER REFERENCES

"Ozone, Its Manufacture, Properties and Uses," Vosmaer, 1916, pp. 112 and 113.

WINSTON A. DOUGLAS, *Primary Examiner.*

JOHN R. SPECK, *Examiner.*